(12) United States Patent
Sisbot et al.

(10) Patent No.: US 9,475,195 B2
(45) Date of Patent: Oct. 25, 2016

(54) ANTICIPATORY ROBOT NAVIGATION

(71) Applicant: TOYOTA JIDOSHA KABUSHIKI KAISHA, Toyota-shi, Aichi-ken (JP)

(72) Inventors: Emrah Akin Sisbot, Mountain View, CA (US); Akansel Cosgun, Atlanta, GA (US)

(*) Notice: Subject to any disclaimer, the term of this patent is extended or adjusted under 35 U.S.C. 154(b) by 0 days.

(21) Appl. No.: 14/485,526

(22) Filed: Sep. 12, 2014

(65) Prior Publication Data

US 2016/0075026 A1    Mar. 17, 2016

(51) Int. Cl.
*G05B 19/18* (2006.01)
*B25J 9/16* (2006.01)

(52) U.S. Cl.
CPC .................. *B25J 9/1676* (2013.01)

(58) Field of Classification Search
USPC ....... 700/246, 245, 264, 250, 253, 255, 254; 701/300
See application file for complete search history.

(56) References Cited

U.S. PATENT DOCUMENTS

| | | | |
|---|---|---|---|
| 8,442,714 B2 | 5/2013 | Matsukawa et al. | |
| 2009/0043440 A1 | 2/2009 | Matsukawa | |
| 2009/0143932 A1* | 6/2009 | Sekiya | B25J 19/023 701/26 |
| 2010/0324771 A1 | 12/2010 | Yabushita | |
| 2014/0009561 A1 | 1/2014 | Sutherland | |
| 2014/0180526 A1* | 6/2014 | Deshpande | G05D 1/0248 701/25 |
| 2014/0350725 A1* | 11/2014 | LaFary | G06N 3/008 700/253 |
| 2015/0253777 A1* | 9/2015 | Binney | G05D 1/0214 701/28 |

OTHER PUBLICATIONS

Sisbot, E.A., Marin-Urias, L.F., Alami, R., Simeon, T. (2007) A Human Aware Mobile Robot Motion Planner. University of Toulouise, 10 pgs.
Kruse, T., Kirsch, A., Sisbot, E.A., Alami, R. (2010) Dynamic Generation and Execution of Human Aware Navigation Plans. International Foundation for Autonomous Agents and Multiagent Systems, 3 pgs.
Pacchierotti, E., Christensen, H.I., Jensfelt, P. (2006) Embodied Social Interaction for Service Robots in Hallway Environments. Centre for Autonomous Systems, Swedish Royal Institute of Technology, 12 pgs.

* cited by examiner

*Primary Examiner* — Ronnie Mancho
(74) *Attorney, Agent, or Firm* — Burbage Law, P.C.; Elizabeth Ruzich; Jon-Michael Burbage

(57) ABSTRACT

The disclosure includes a system and method for using a robot to simulate user motions by detecting a user, estimating a first position and orientation of the user, determining a current position of the robot, generating an initial path from the current position of the robot to a goal position based on whether the robot affects the user while travelling on the initial path, determining whether the user will traverse in response to the robot when the robot travels on the initial path, responsive to the user traversing in response to the robot, estimating a second position where the user will move when the robot is near, and generating a new path from the current position of the robot to the goal position.

20 Claims, 9 Drawing Sheets

ANTICIPATORY ROBOT NAVIGATION

BACKGROUND

The specification relates to using a robot to simulate user motions.

People are not bothered by the motions of other people because their motion is more predictable. When people encounter a robot that passes near them, the robot's motions may cause the people to feel uncomfortable because the robot's motion is unpredictable. This limits acceptance of robots in the environment because people do not trust them. As a result, there are missed opportunities where robots could be used to help people.

Existing solutions involve systems for avoiding obstacles that fail to consider the complexity of human reactions. For example, solutions exist for generating a path to avoid humans, but the solutions fail to consider that humans may react to the robot regardless of whether the robot is too close.

SUMMARY

According to one innovative aspect of the subject matter described in this disclosure, a system for using a robot to simulate user motions is described. The system includes a processor and a tangible, non-transitory memory storing instructions that, when executed, cause the system to: detect a user, estimate a first position and orientation of the user, determine a current position of a robot, generate an initial path from the current position of the robot to a goal position based on whether the robot affects the user while travelling on the initial path, determine whether the user will traverse in response to the robot when the robot travels on the initial path, responsive to the user traversing in response to the robot, estimate a second position where the user will move when the robot is near, and generate a new path from the current position of the robot to the goal position.

In general, another innovative aspect of the subject matter described in this disclosure may be embodied in methods that include detecting a user, estimating a first position and orientation of the user, determining a current position of a robot, generating an initial path from the current position of the robot to a goal position based on whether the robot affects the user while travelling on the initial path, determining whether the user will traverse in response to the robot when the robot travels on the initial path, responsive to the user traversing in response to the robot, estimating a second position where the user will move when the robot is near, and generating a new path from the current position of the robot to the goal position.

Other aspects include corresponding methods, systems, apparatus, and computer program products for these and other innovative aspects.

These and other embodiments may each optionally include one or more of the following operations and features. For instance, the operations include: generating velocity constraints for the robot to follow the new path and instructing the robot to move to the goal position based on the new path and the velocity constraints. For instance, the features include responsive to determining that the user will not traverse, instructing the robot to move based on the initial path; generating the initial path further comprising assigning a Gaussian cost to the user with a maximum range, receiving the goal position, an environment map, and the current position for the robot, generating a two-dimensional grid with the first position of the user, the current position of the robot, and the goal position, generating the initial path, determining whether the initial path will disturb the user, and responsive to the initial path failing to disturb the user, outputting the initial path; responsive to the initial path disturbing the user, revising the initial path to include a longer route that avoids disturbing the user and outputting the initial path; the Gaussian cost increasing when at least two of the users are facing each other; the initial path including users and wherein generating the new path from the current position of the robot to the goal position further comprises detecting users in the environment, clustering the users into user groups, computing a portion of the initial path that intersects with the user groups, and applying a social forces model to the robot and the user groups; social forces model including a goal force, a social force, an obstacle force, and a group force; and generating the initial path based on avoiding obstacles.

Throughout the disclosure, the term "data" may be used to represent any digital data undergoing the transfer functions or operations described herein. The digital data may include, but is not limited to, network services data, connectivity map data, journey data, user profile data, time synchronicity data, historical journey data, preference hierarchy data, dead zone data, navigation map data, mesh network data, velocity data, data to be shared between two or more entities (e.g., servers, vehicle systems, mobile client devices, client devices, etc.) and data to be transferred between two or more entities.

The disclosure is particularly advantageous in a number of respects. For example, because the robot simulates user motions, it makes people more comfortable and trusting of the robot. As a result, robots can be used more frequently. In addition, the robot moves more naturally, does not get stuck in places, and does not generate hard-to-understand motions. Yet another advantage is in improving the accessibility of robots. For example, the disclosure describes behaviors that might make it easier for a robot to clean a house. Lastly, the system will quickly react to unanticipated user motion, which will help avoid collisions.

The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
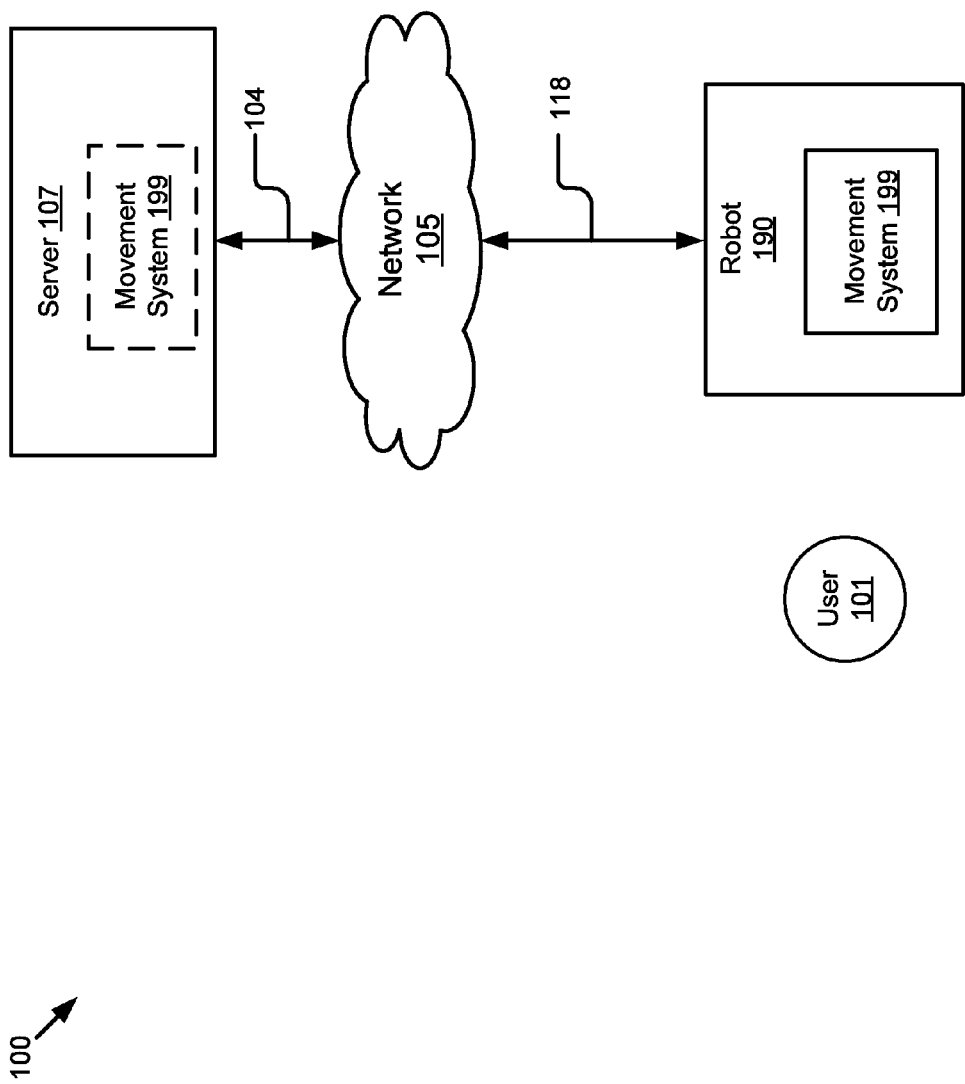
FIG. 1 is a block diagram illustrating an example system for using a robot to simulate user motions.

FIG. 1 illustrates a block diagram of some embodiments of a system 100 for using a robot to simulate user motions. The system 100 includes a server 107 communicatively coupled to a network 105 via signal line 104, a robot 190 communicatively coupled to the network 105 via signal line 118, and a user 101.

While FIG. 1 illustrates one user 101, one server 107, and one robot 190, the disclosure applies to a system architecture including one or more users 101, one or more servers 107, and one or more robots 190. Furthermore, although FIG. 1 illustrates one network 105 coupled to the entities of the system 100, in practice one or more networks 105 of various types may be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 105 may include a GPS satellite for providing GPS navigation to the robot 190. The network 105 may be a mobile data network, for example, 3G, 4G, LTE, Voice-over-LTE ("VoLTE") or any other mobile data network or combination of mobile data networks. In some embodiments, the network 105 may be a combination of different networks.

The robot 190 may be computing device that includes a memory and a processor, for example, a laptop computer, a desktop computer, a tablet computer, a mobile telephone, a personal digital assistant ("PDA"), a mobile e-mail device, a portable game player, a portable music player, a connected device or wearable computer (e.g., a smart watch, smart glasses, fitness tracker, etc.), a television with one or more processors embedded therein or coupled thereto, a vehicle, or other electronic device capable of accessing the network 105. The robot 190 includes a movement system 199. The movement system 199 generates a path for the robot 190 from a current position to a goal position. The movement system 199 generates an initial path that minimizes disturbance to the user 101. For example, where the shortest path to the goal position intersects a group of people, the movement system 199 takes into account the disturbance that would be caused by the robot 190 travelling between the people in the group. In addition, the movement system 199 predicts whether the users will move when the robot 190 moves on the initial path. If the movement system 199 predicts movement, the movement system 199 will generate a new path that takes user movement into account.

The robot 190 may include functionality to enable a user to consume network services. The network services may include any service accessible via the network 105. For example, the network services include navigation instructions, streaming audio or video (such as Pandora™, Spotify™, iTunes™, Google Play™, YouTube™, etc.), social networking (such as Facebook™, Google+™, LinkedIn™, Tinder™, QQ™, etc.), microblogging (such as Twitter™, Tumblr™, etc.), online chatting (such as SnapChat™, WhatsApp™, etc.), online content sharing (such as Instagram™, Pinterest™, etc.), e-mail (such as Gmail™, Outlook™, Yahoo! Mail™, etc.), file sharing (such as DropBox™, Google Drive™, MS One Drive™, Evernote™, etc.), calendar and scheduling (such as Google™ Calendar, MS Outlook™, etc.), etc.

In some embodiments, the movement system 199 is also stored on a server 107. The movement system 199 is depicted with dashed lines in FIG. 1 in order to indicate that the movement system 199 is optionally stored on the server 107. The server 107 includes a memory and a processor. In one embodiment, the movement system 199 is stored in part on the robot 190 and in part on the server 107. For example, the robot 190 transmits information about the robot's 190 position to the server 107, which calculates the initial path and new path if applicable and transmits the path instructions back to the robot 190.

The movement system 199 may include code and routines for using a robot to simulate motion of a user, for example, a person. The movement system 199 detects the user and estimates a first position and orientation of the user. The movement system 199 determines a current position of the robot and generates an initial path from the current position of the robot to a goal position based on whether the robot affects the user while travelling on the initial path. For example, the movement system 199 uses a disturbance metric based on a Gaussian function to determine when the user will be disturbed by the robot 190.

The movement system 199 determines whether the user will traverse in response to the robot 190 when the robot 190 travels on the initial path. For example, the movement system 199 determines whether the user will take a step back to avoid the robot 190. If the movement system 199 determines that the user will traverse in response to the robot, the movement system 199 estimates a second position where the user will move when the robot is near and generates a new path from the current position of the robot 190 to the goal position. In some embodiments, the new path is based on a social forces module. The movement system 199 generates velocity constraints for the robot 190 to follow the new path and instructs the robot 190 to move to the goal position based on the new path and the velocity constraints.

In some embodiments, the movement system 199 can be implemented using hardware including a field-programmable gate array ("FPGA") or an application-specific integrated circuit ("ASIC"). In some other embodiments, the movement system 199 can be implemented using a combination of hardware and software. The movement system 199 may be stored in a combination of the devices and servers, or in one of the devices or servers.

Example Movement System

Figure 2:
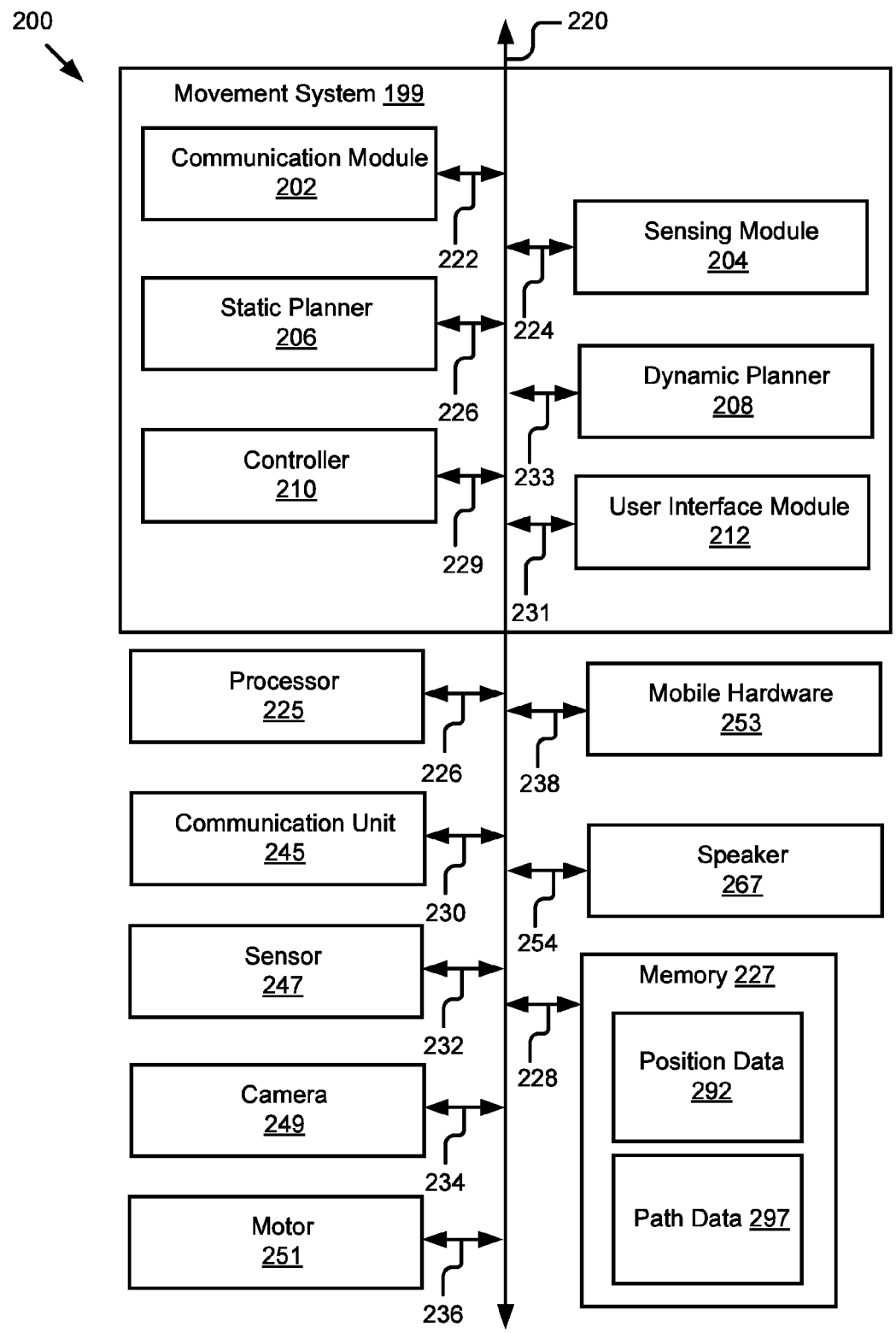
FIG. 2 is a block diagram illustrating an example movement system.

Referring now to FIG. 2, an example of the movement system 199 is shown in more detail. FIG. 2 is a block diagram of a system 200. The system 200 may be the robot 190 or the server 107 in the system 100 illustrated in FIG. 1. The system 200 may include the movement system 199, a processor 225, a memory, a communication unit 245, a sensor 247, a camera 249, a motor 251, mobile hardware 253, and a speaker 267 according to some examples. The components of the system 200 are communicatively coupled by a bus 220.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 226. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 228. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores position data 292 and path data 297. The memory 227 may also store other data for providing the functionality described herein.

The position data 292 may include, but are not limited to, data describing the position of users 101 and robots 190. For example, the position data 292 may include the position information determined by a sensing module 204, an environment map, and the two-dimensional grid generated by a static planner 206. The environmental map includes the location of objects, robots 190, and users 101. The two-dimensional grid includes the position of the users 101, the current position of the robot, and the goal position of the robot 190.

The path data 297 may include the initial path generated by the static planner 206 and the new path generated by a dynamic planner 208. In some embodiments, the path data 297 includes all paths generated by the movement system 199, which are retrieved by the static planner 206 or the dynamic planner 208. The static planner 206 or the dynamic planner 208 then apply learning algorithms to the path data 297 to determine how to improve the algorithms used based on learned data.

The communication unit 245 transmits and receives data to and from at least one of the server 107 and the robot 190 in the system 100. The communication unit 245 is coupled to the bus 220 via a signal line 230. In some embodiments, the communication unit 245 includes a port for direct physical connection to the network 105 or to another communication channel. For example, the communication unit 245 includes a USB, SD, CAT-5, or similar port for wired communication with other entities in the system 100. In some embodiments, the communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

In the illustrated implementation shown in FIG. 2, the movement system 199 includes a communication module 202, a sensing module 204, a static planner 206, a dynamic planner 208, a controller 210, and a user interface module 212. These modules of the movement system 199 are communicatively coupled to each other via the bus 220.

In some embodiments, modules of the movement system 199 can be stored in a single server or device. In some other embodiments, modules of the movement system 199 can be distributed and stored across multiple servers or devices. Furthermore, the separation of various components, modules, and servers in the embodiments described herein should not be understood as requiring such separation in all embodiments. In some embodiments, the described components, modules, devices, or servers can generally be integrated together in a single component, module, device, or server.

The sensor 247 is any device that senses physical changes. The sensor 247 is coupled to the bus 220 via signal line 232. In one embodiment, the sensor 247 is a motion detector. For example, the sensor 247 is a gyroscope that measures orientation of the robot 190. In another example, the sensor 247 is an accelerometer that is used to measure acceleration of the robot 190. In yet another example, the sensor 247 includes location detection, such as a global positioning system (GPS), location detection through triangulation via a wireless network, etc. In some embodiments, the sensor 247 transmits the location information to the sensing module 204 via the communication module 202. In some embodiments, the sensor 247 transmits the location information to the static planner 206, the dynamic planner 208, or the controller 210 via the communication module 202. In other embodiments, the sensor 247 stores the location information as part of the position data 292 in the memory 227.

In some embodiments, the sensor 247 may include a depth sensor. In some embodiments, the depth sensor determines depth using structured light, such as a speckle pattern of infrared laser light. In another embodiment, the depth sensor determines depth using time-of-flight technology that determines depth based on the time it takes a light signal to travel between the camera and an object. For example, the depth sensor is a laser rangefinder. The depth sensor may be used to identify drops and the dimensions of the drops including their depth. In some embodiments, the sensor 247 transmits the depth information to the sensing module 204 for identifying the position of users 101 and robots 190, the static planner 206 for determining an initial path, the dynamic planner 208 for determining a new path, or the controller 210 for generating vector constraints. In other embodiments, the sensor 247 stores the depth information as part of the position data 292 in the memory 227.

In one embodiment, the sensor 247 includes a microphone for converting sound into electrical signals. The microphone may receive instructions from a visually-impaired user 101 for fulfilling a request, such as providing directions to the visually-impaired user 101. The microphone transmits the electrical signals to the movement system 199 for processing of the instructions.

The camera 249 is a physical device for capturing images that is coupled to the bus 220 via signal line 234. In one embodiment, the camera 249 captures electronic images. The camera 249 includes an image sensor, such as a charge-coupled device (CCD) or a complementary metal-oxide semiconductor (CMOS) for converting an optical image to electrical signals. In one embodiment, the camera 249 sends the electrical signals to the sensing module 204 for identifying the position of users 101 and robots 190, the static planner 206 for determining an initial path, the dynamic planner 208 for determining a new path, or the controller 210 for generating vector constraints via the communication module 202 for identification of the location of users 101 and robots 190. In another embodiment, the camera 249 stores the electrical signals in the memory 227 as part of the position data 292.

In embodiments where the system 200 is a robot 190, the system 200 includes a motor 251 and mobile hardware 253. The motor 251 is coupled to the bus 220 via signal line 236. The mobile hardware 253 is coupled to the bus 220 via signal line 238. The motor 251 includes hardware for powering the mobile hardware 253. The mobile hardware 253 includes hardware for moving the robot 190, such as wheels. The motor 251 and the mobile hardware 253 are used to move the robot 190. For example, the dynamic planner 208 instructs the motor 251 to drive the mobile hardware 253 to reposition the robot 190 between the user and the risk.

The speaker 267 is optional hardware for generating audible alerts that is coupled to the bus 220 via signal line 254. For example, where the system 200 is a robot 190, the speaker 267 receives instructions from the movement system 199 to warn users that the robot 190 is approaching 190. In some embodiments, the instructions from the movement system 199 may also pertain to a job performed by the robot, such as if the robot is a vacuum and the audible alerts notifies users that the vacuuming job is complete.

In some embodiments, each of the modules 202, 204, 206, 208, 210, and 212 in the movement system 199 can be a set of instructions executable by the processor 225 to provide the functionality described below. In some other embodiments, each of the modules 202, 204, 206, 208, 210, and 212 can be stored in the memory 227 and can be accessible and executable by the processor 225 of the system. Each of the modules 202, 204, 206, 208, 210, and 212 may be adapted for cooperation and communication with the processor 225 and other components of the system 200. In some embodiments, each of the modules 202, 204, 206, 208, 210, and 212 may be adapted to function as one or more thin clients that are stored and executed by a processor of the system 200.

The communication module 202 can be software including routines for handling communications between the movement system 199 and other components of the system 200. In some embodiments, the communication module 202 can be a set of instructions executable by the processor 225 to provide the functionality described below for handling communications. The communication module 202 may be communicatively coupled to the bus 220 via signal line 222.

The communication module 202 sends and receives data, via the communication unit 245, to and from one or more of the server 107 and the robots 190. For example, the communication module 202 receives, via the communication unit 245, a determination from the movement system 199 on the server 107 that the robot 190 is too close to some users.

In some embodiments, the communication module 202 receives data from components of the movement system 199 and stores the data in the memory 227. In some embodiments, the communication module 202 retrieves data from the memory 227 and sends the data to one or more components of the movement system 199. In some embodiments, the communication module 202 may handle communications between components of the movement system 199. For example, the communication module 202 receives data from one module and sends the data to another module.

The sensing module 204 can be software including routines for detecting users 101, estimating the position and orientation of users, and determining a current position of the robot 190. In some embodiments, the sensing module 204 can be a set of instructions executable by the processor 225 to provide the functionality described below for sensing users and robots 190. The sensing module 204 may be communicatively coupled to the bus 220 via signal line 224.

In some embodiments, the sensing module 204 receives images from the camera 249 via the communication module 202. The sensing module 204 identifies the location and orientation of the user from the images. The location may be expressed as longitude and latitude coordinates, according to a Cartesian coordinate system, etc. For example, the sensing module 204 identifies four humans and a dog: two humans are isolated and two are in a group. The dog is also isolated. If the grid with the users was configured as an x, y grid with a maximum of 5 units in each direction, the first user is at −2, 2 and facing 45 degrees; the second user is at −2, −1 and facing at 90 degrees; the dog is at 1, 1 and facing at 90 degrees, the third user is at 2, −3 and facing at 135 degrees; and the fourth user is at 3, −3 and facing 315 degrees. The sensing module 204 outputs a vector of user positions.

The sensing module 204 determines a current position of the robot 190. For example, the sensing module 204 uses a sensor 247 that is part of the robot 190 to determine the robot's 190 location, such as GPS, triangulating signals using WiFi, etc. In another example, the sensing module 204 determines the current position of the robot 190 by receiving images from the camera 249 and comparing the location of known objects in the images to the robot 190.

The static planner 206 can be software including routines for generating an initial path from the current position of the robot to a goal position of the robot 190 based on whether the initial path affects the user. In some embodiments, the static planner 206 can be a set of instructions executable by the processor 225 to provide the functionality described below for generating an initial path. The static planner 206 may be communicatively coupled to the bus 220 via signal line 226.

The static planner 206 determines whether the robot 190 will affect the user while travelling on the initial path, for example, based on a disturbance metric. The disturbance metric is the increasing cost of passing between two or more users that are close to each other and looking at each other. In one embodiment, the static planner 206 assigns a Gaussian cost to the user with a maximum range. The maximum range is the maximum distance from the user to the robot 190 that will disturb the user. For example, one foot. The maximum range is also known as a disturbance cost.

$$Cost_{dist}(x, y, a) = \max(0, f(d) \cdot (\overrightarrow{AA'} \cdot \overrightarrow{AB} + \overrightarrow{BB'} \cdot \overrightarrow{BA}))$$

$$f(d) = \frac{1}{d} - \frac{1}{d_{max}}$$

Where x,y are spatial coordinates, a is the next action of the robot, d_max is the maximum range, d is current range, AA' is the vector of the orientation of the person A, and BB' is the vector of the orientation of the person B.

In some embodiments, the maximum distance is the same for all users. In another example, where the static planner 206 is configured to perform image recognition to recognize users, the maximum distance is personalized. For example, some people would be disturbed by a robot 190 that moves within two feet of them. Other users would be undisturbed unless the robot 190 was very close, such as only six inches away. In some embodiments, the static planner 206 performs image recognition and generates a user profile for each user that defines the maximum range according to the distance at which a user reacts to the robot 190.

In some embodiments, the static planner 206 receives the goal position for the robot 190, an environment map, and the robot's 190 current position. In some embodiments the static planner 206 receives the data from the sensing module 204. In other embodiments, the static planner 206 retrieves the data as position data 292 from the memory 227. The static planner 206 generates a two-dimensional grid with a first position of the user, the current position of the robot, and the goal position of the robot 190. The static planner 206 uses the two-dimensional grid to generate the initial path.

The static planner 206 determines whether the initial path will disturb the user. If not, the static planner 206 outputs the initial path. If the initial path would disturb the user, the static planner 206 revises the initial path to include a longer route that avoids disturbing the user. For example, the revisions to the initial path ensure that the initial path is collision free with a minimal overlap with the maximum range. For example, where the shortest distance for the initial path cuts between two users who are part of a group, the static planner 206 generates an initial path that avoids overlapping with the maximum range.

Figure 3A:
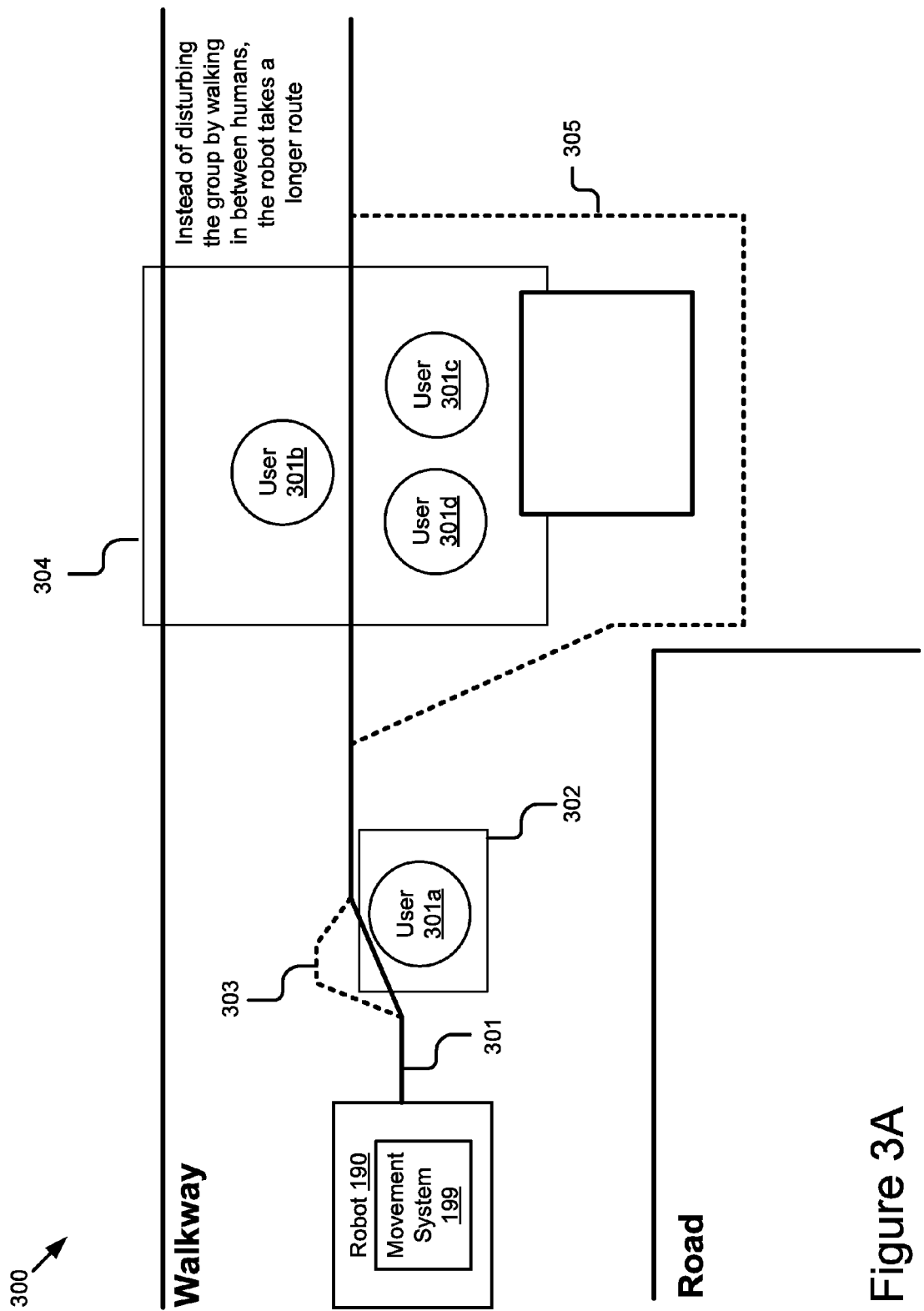
FIG. 3A is a graphic illustrating an example scenario where the initial path is created to minimize disturbing the user.

FIG. 3A illustrates an example scenario 300 where the static planner 206 revises the initial path to avoid disturbing users. In this example, the static planner 206 generates the initial path as represented by a solid line 301. The static planner 206 determines that the initial path disturbs a first user 301a because the initial path interferes with the maximum range 302 surrounding the first user 301a. Although the maximum range 302 is illustrated as being a square, other configurations are possible, such as circles, rectangles, etc. The static planner 206 revises the initial path as illustrated by the dotted lines 303 to avoid disturbing the user.

Next, the initial path intersects a group of users 301b, 301c, and 301d that are looking at each other. The initial path has a high disturbance cost because it is in the middle of a maximum range 304 surrounding the users 301b, 301c, and 301d. The maximum range 304 spans past the walkway north of the group and the building south of the group. As a result, the static planner 206 generates a longer path 305 south of the building that avoids the group entirely.

The dynamic planner 208 can be software including routines for determining whether the user will traverse in response to the robot 190 and if so, generating a new path. In some embodiments, the dynamic planner 208 can be a set of instructions executable by the processor 225 to provide the functionality described below for generating the new path. The dynamic planner 208 may be communicatively coupled to the bus 220 via signal line 233.

The dynamic planner 208 determines whether the user traverses in response to the robot when the robot travels on the initial path. For example, the user might step backwards as the robot 190 approaches even though the robot 190 is not disturbing the user. If the dynamic planner 208 predicts that the user will not move in response to the robot, the dynamic planner 208 instructs the robot to move based on the initial path. If the dynamic planner 208 predicts that the user will move, the dynamic planner 208 estimates a second position where the user will move when the robot is near and generates a new path from the current position of the robot to the goal position.

In some embodiments, the dynamic planner 208 generates the new path by detecting users in the environment and clustering the users into user groups. The dynamic planner 208 computes a portion of the initial path that intersects with the user groups and applying a social forces model to the robot and the user groups to determine a new path based on how the users will react to the robot 190 intersecting with the user groups. In some embodiments, the dynamic planner 208 also determines objects in the environment, such as buildings, cars, signs, lampposts, etc.

The social forces model may be described by the following equation:

$$F = w_{goal} \vec{F}_{goal} + w_{social} \vec{F}_{social} + w_{obs} \vec{F}_{obs} + w_{group} \vec{F}_{group}$$

The force F_goal represents the attraction towards a sub-goal. For an immobile user 101, the F_goal attracts towards the user's 101 current position. For a moving user 101, the F_goal is an attractor towards the user's motion direction. For the robot 190, the force is an attractor to its goal. The force F_social is a repulsion from other agents. Specifically, robot-user couples and user-user couples repulse each other. For example, user-user couples will avoid colliding with a robot-user couple. The force F_obs is a repulsion from the nearest obstacle. Obstacles repulse the robot 190 and the users. For example, neither the robot 190 nor users want to collide with a building. The force F_group is an attraction towards group members because users try to maintain the groups.

In some embodiments, a user will react to the robot 190 in an unanticipated way. In response, the dynamic planner 208 may generate a new path. For example, the dynamic planner 208 will use the method described above for determining the new path based on the new position of the users. This advantageously results in a system that reacts quickly to changes.

Figure 3B:
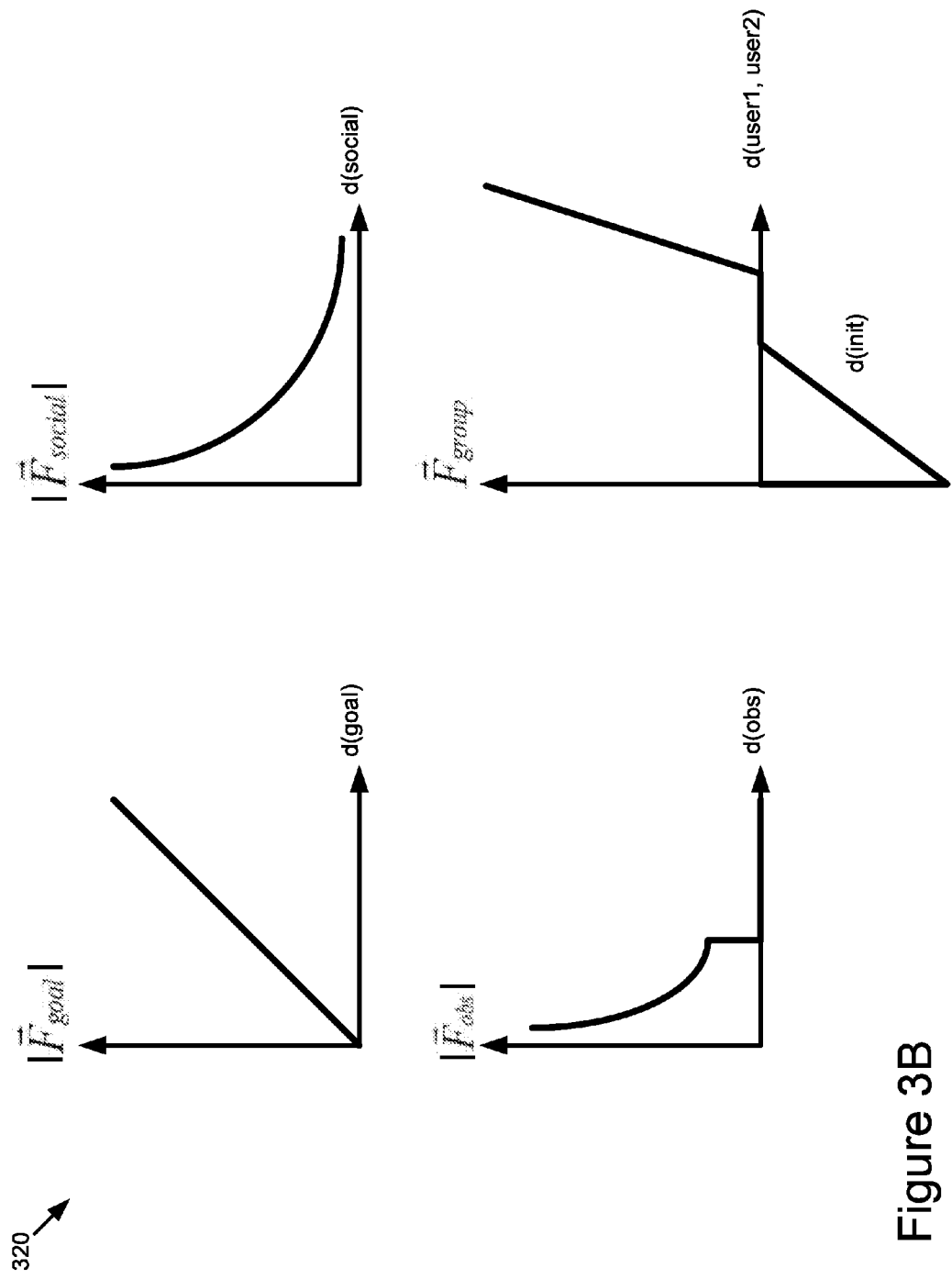
FIG. 3B is illustrates example graphs of social forces.

FIG. 3B illustrates different forces 320. The norm of the goal force (F_goal) is directly proportional to the distance of the goal because the goal force is an attractive force. The norm of the social force (F_social) is inversely proportional to distance of another agent because the social force is repulsive. The norm of the obstacle force (F_obs) is inversely proportional to the distance of the obstacle until the user or robot 190 is too far from the obstacle, at which point the obstacle force drops to zero. The group force (F_group) is a function of the user-user couple which tries to keep the formation (attracts if people moves away from each other, repulses if people are too close to each other).

Figure 3C:
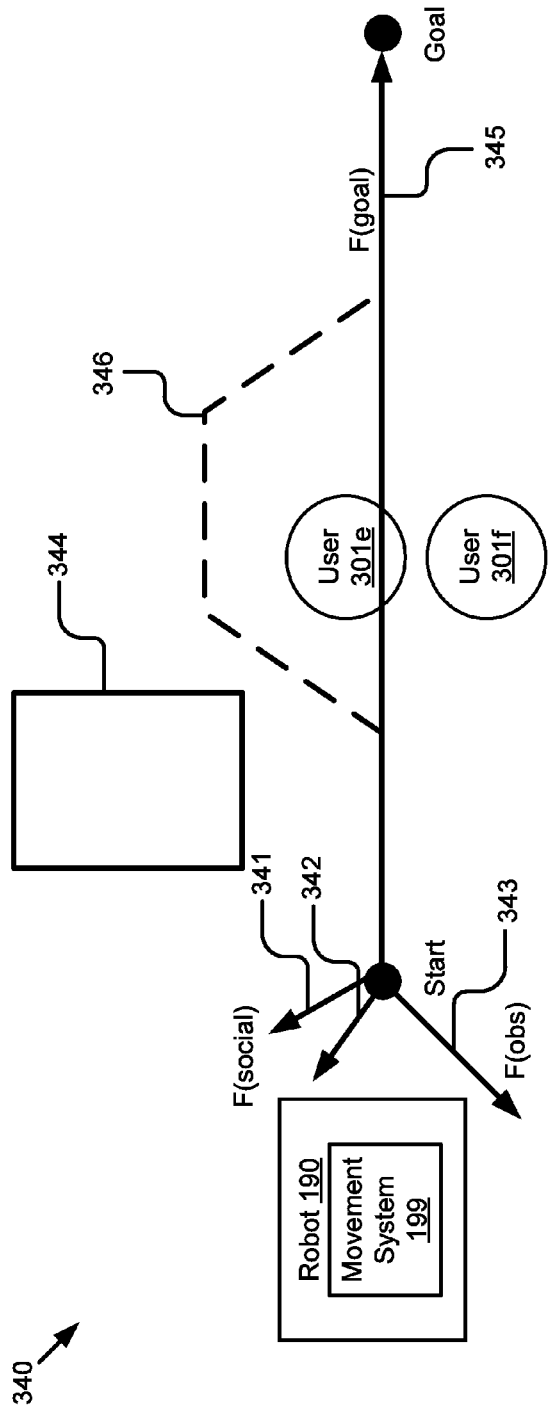
FIG. 3C is a graphic illustrating social forces in an example scenario.

FIG. 3C illustrates an example scenario 340 illustrating the forces applied to the robot 190. Social forces 341, 342 are repulsive forces pointing away from users 301e and 301f, respectively. An obstacle force 343 is a repulsive force pointing away from an obstacle 344. A goal force 345 points towards the goal. The static planner 206 generates an initial path from the start to the goal. The path includes a dotted line 346, which is designed to avoid disturbing the user. The dynamic planner 208 generates a new path, which in this example is the same as the goal forces 345. Because the dynamic planner 208 estimated that the user 301e would step backwards as the robot approached and, as a result, would overlap with the initial path, the dynamic planner 208 generated the new path to anticipate the user's 301e second position.

Figure 3D:
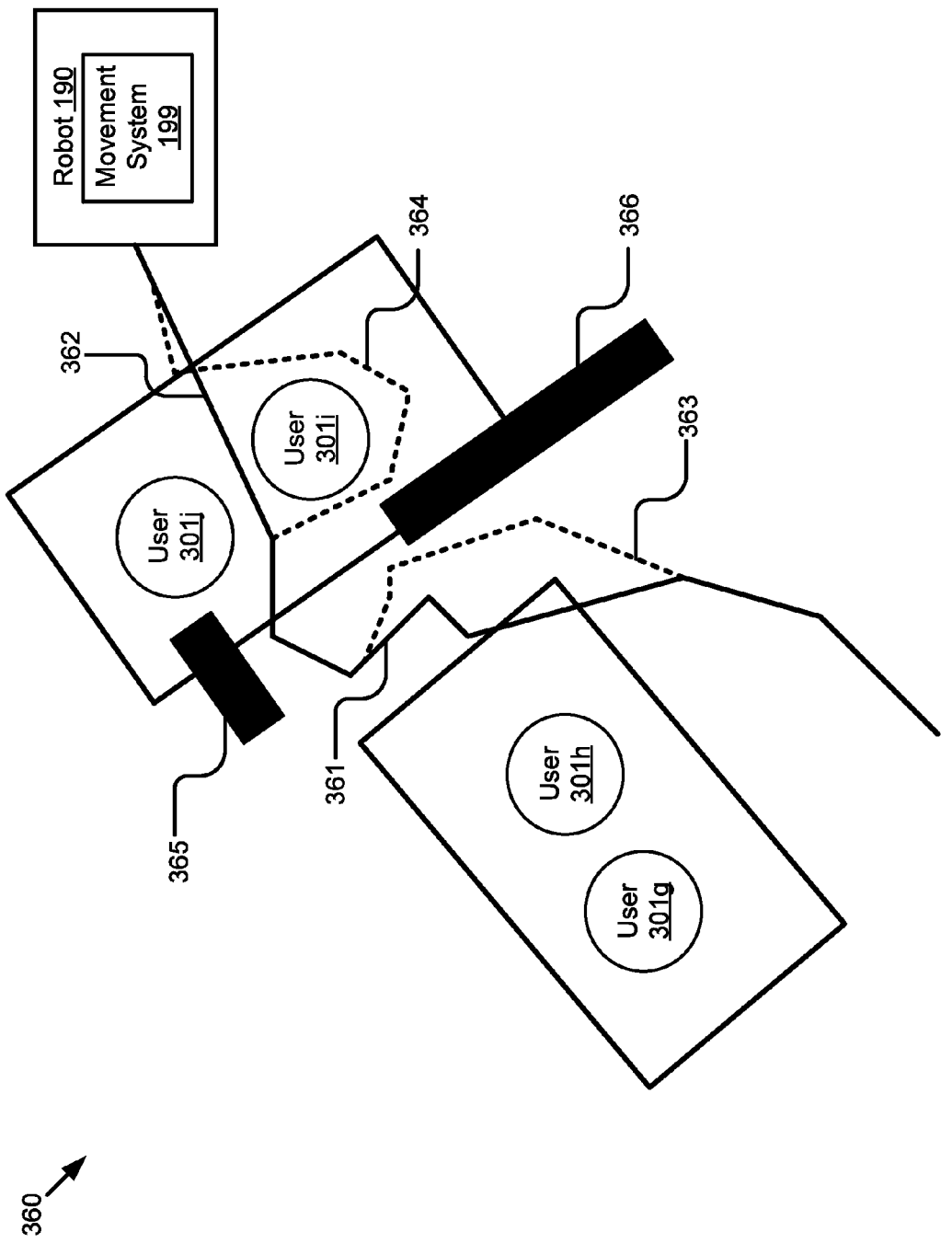
FIG. 3D is a graphic illustrating an example scenario where the initial path is replaced with a new path that takes into account user movement in response to the robot.

FIG. 3D illustrates another example scenario 360 where the dynamic planner 208 generates a new path 361, 362. For a first group of users 301g, 301h, the dynamic planner 208 replaces an initial path 363 with the new path 361 because it is smoother. For the second group of users 301i, 301j, the dynamic planner 208 replaces an initial path 364 with the new path 362 in response to determining that the user 301j would move backwards into the initial path 364 and the user 301j would move to stop blocking the entrance to the room as illustrated by obstacles 365, 366. If, however, the user 301j did not move to stop blocking the door, the controller 210 would generate a new path that stops before colliding with the user 301j.

The controller 210 can be software including routines for generating velocity constraints for the robot to follow the new path and generating instructions for moving the robot 190. The controller 210 may be communicatively coupled to the bus 220 via signal line 229.

The controller 210 may generate velocity constraints to follow the new path as close as possible. For example, the controller 210 determines the direction and velocity for moving along the new path. In instances where the dynamic planner 208 did not determine that the user will move to a second position, the controller 210 generates velocity constraints to follow the initial path.

Once the controller 210 determines the velocity constraints, the controller 210 instructs the motor 251 to power the mobile hardware 253 to move the robot 190. In situations where the user does not move as estimated, the controller 210 generates velocity constraints for avoiding a collision. For example, where the user is blocking the initial path and there is no alternative route possible, such as when the user is blocking a door, the controller 210 will instruct the motor 251 to stop powering the mobile hardware 253.

The user interface module 212 can be software including routines for generating graphical data for providing user interfaces. In some embodiments, the user interface module 212 can be a set of instructions executable by the processor 225 to provide the functionality described below for generating graphical data for providing user interfaces. The user interface module 212 may be adapted for cooperation and communication with the processor 235 and other components of the computing device 200 via a signal line 231.

In some embodiments, the user interface module 212 generates a user interface for an administrator to change the settings on the robot 190. For example, the administrator may modify the maximum range or generate user profiles for specific people. In embodiments where the robot 190 performs tasks for users, the user interface may include information about the tasks. For example, where the robot 190 vacuums up dirt, the user interface may include notifications about the robot's 190 battery status, an indicator about how full the trash bag is, etc.

Example Methods

Figure 4:
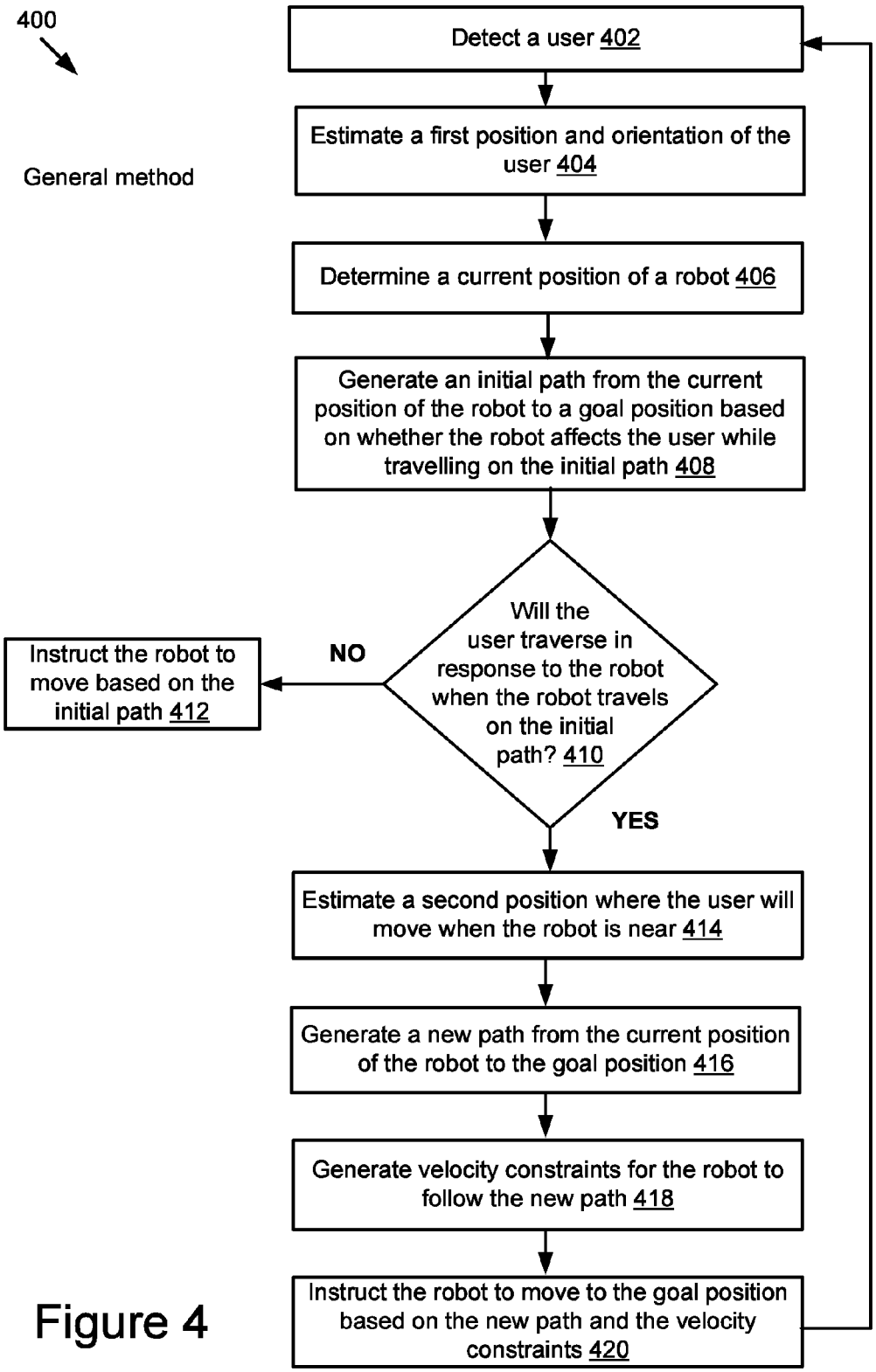
FIG. 4 is a flowchart of an example method for generating an initial path and a new path for a robot to travel from a current position to a goal position.

Referring now to FIG. 4, an example of a method 400 for using a robot to simulate user motions is described. In some embodiments, the method 400 may be performed by modules of the movement system 199 stored on the server 107 or the robot 190. For example, the movement system 199 may include a sensing module 204, a static planner 206, a dynamic planner 208, and a controller 210.

The sensing module 204 detects 402 a user and estimates 404 the first position and orientation of the user. For example, the sensing module 204 communicates with the sensor 247 or the camera 249 via the communication unit 202 to determine the position and orientation of the user. The sensing module 204 determines 406 a current position of a robot. For example, the sensing module 204 communicates with a sensor 247 that provides GPS coordinates to determine the current position of the robot.

The static planner 206 generates 408 an initial path from the current position of the robot to a goal position based on whether the robot 190 affects the user while travelling on the initial path. For example, the static planner 206 determines whether the user is disturbed by the robot 190 based on a disturbance metric.

The dynamic planner 208 determines 410 whether the user will traverse in response to the robot 190 when the robot 190 travels on the initial path. If the dynamic planner 208 determines that the robot 190 does not traverse, the dynamic planner 208 instructs 412 the robot 190 to move based on the initial path. If the dynamic planner 208 determines that the user will traverse, the dynamic planner 208 estimates 414 a second position where the user will move when the robot is near. For example, the dynamic planner 208 determines that the user will step backwards when the robot 190 approaches to allow the robot 190 to pass. The dynamic planner 208 generates 416 a new path from the current position of the robot 190 to the goal position. For example, the dynamic planner 208 generates a new path that anticipates that the user would have stepped backwards into the initial path that was designed to avoid disturbing the user. As a result, the better path would be in front of the user.

The controller 210 generates 418 velocity constraints for the robot 190 to follow the new path and instructs 420 the robot 190 to move to the goal position based on the new path and the velocity constraints. For example, the controller 210 instructs the motor 251 to power the mobile hardware 253 to follow the new path based on the velocity constraints. Once the robot 190 moves, the sensing module 204 begins the process of detecting 402 the user again.

Figure 5:
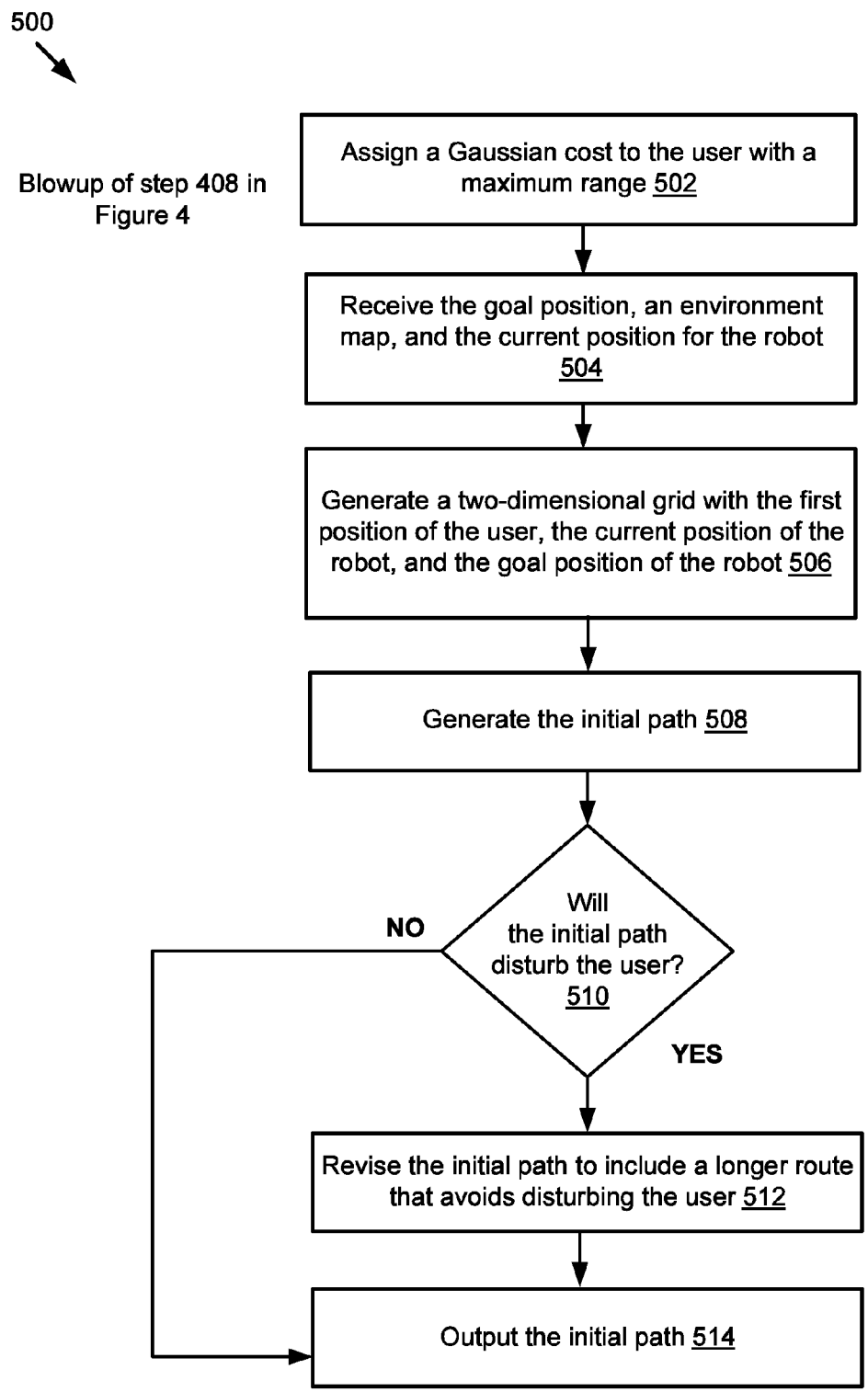
FIG. 5 is a flowchart of an example method for adjusting the initial path to minimize disturbance to the user.

FIG. 5 is a flowchart of an example method 500 for adjusting the initial path to minimize disturbance to the user. The static planner 206 assigns 502 a Gaussian cost to the user with a maximum range. The maximum range represents a disturbance cost. For example, the closer the robot 190 gets to overlapping with the maximum range, the higher the cost. The static planner 206 receives 504 the goal position, an environment map, and the current position for the robot 190. The static planner 206 generates 506 a two-dimensional grid with the first position of the user, the current position of the robot, and the goal position of the robot 190. The static planner 206 generates 508 the initial path based on the two-dimensional grid. The static planner 206 determines 510 whether the initial path will disturb the user. For example, the static planner 206 determines that the initial path is collision free with minimal overlap with the maximum range. If the initial path will not disturb the user, the static planner 206 outputs 514 the initial path. If the initial path will disturb the user, the static planner 206 revises 512 the initial path to include a longer route that avoids disturbing the user.

Figure 6:
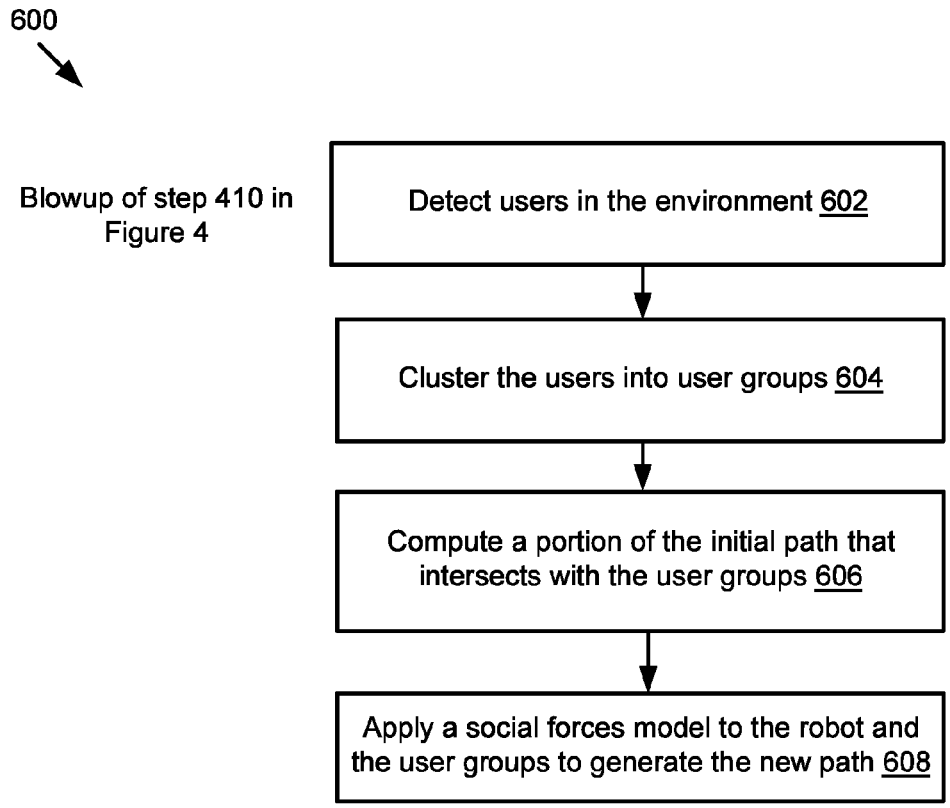
FIG. 6 is a flowchart of an example method for generating a new path that takes into account a group of users moving in response to the robot.

FIG. 6 is a flowchart of an example method 600 for generating a new path that takes into account a group of users moving in response to the robot. In this example, there are multiple users in the environment as described by the environment map. The dynamic planner 208 detects 602 users in the environment and clusters 604 the users into user groups. In some embodiments, user groups are determined based on the proximity of users to each other and their orientation, such that users that are facing each other are more likely to be in groups than users that are looking in different directions. The dynamic planner 208 computes 606 a portion of the initial path that intersects with the user groups. For example, the dynamic planner 208 identifies portions of the initial path where the robot is within proximity of the user groups. The dynamic planner 208 applies 508 a social forces model to the robot and the user groups to generate the new path. For example, the dynamic planner 208 determines based on a goal force, a social force, an obstacle force, and a group force where the users are going to move when the robot 190 is near.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments, or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
    detecting a user with a processor-based computing device programmed to perform the detecting;
    estimating a first position and orientation of the user;
    determining a current position of a robot;
    generating an initial path from the current position of the robot to a goal position based on whether the robot affects the user while travelling on the initial path, wherein the robot affects the user if the user is disturbed by the robot;
    determining whether the user will traverse along a user path in response to the robot when the robot travels on the initial path;
    responsive to the user traversing in response to the robot, estimating a second position where the user will move when the robot is near the user; and
    generating a new path from the current position of the robot to the goal position.

2. The method of claim 1, further comprising:
    generating velocity constraints for the robot to follow the new path; and
    instructing the robot to move to the goal position based on the new path and the velocity constraints.

3. The method of claim 1, wherein responsive to determining that the user will not traverse, instructing the robot to move based on the initial path.

4. The method of claim 1, wherein generating the initial path further comprises:

assigning a Gaussian cost to the user with a maximum range;
receiving the goal position, an environment map, and the current position for the robot;
generating a two-dimensional grid with the first position of the user, the current position of the robot, and the goal position;
generating the initial path;
determining whether the initial path will disturb the user; and
responsive to the initial path failing to disturb the user, outputting the initial path.

5. The method of claim 1, wherein generating the initial path further comprises:
    assigning a Gaussian cost to the user with a maximum range;
    receiving the goal position, an environment map, and the current position for the robot;
    generating a two-dimensional grid with the first position of the user, the current position of the robot, and the goal position;
    generating the initial path;
    determining whether the initial path will disturb the user;
    responsive to the initial path disturbing the user, revising the initial path to include a longer route that avoids disturbing the user; and
    outputting the initial path.

6. The method of claim 5, wherein the Gaussian cost is increased as a number of users increases.

7. The method of claim 6, wherein the Gaussian cost is increased when at least two of the users are facing each other.

8. The method of claim 1, wherein the initial path includes users and wherein generating the new path from the current position of the robot to the goal position further comprises:
    detecting the users in the environment;
    clustering the users into user groups;
    computing a portion of the initial path that intersects with the user groups; and
    applying a social forces model to the robot and the user groups.

9. The method of claim 8, wherein the social forces model includes a goal force, a social force, an obstacle force, and a group force.

10. The method of claim 1, wherein generating the initial path is also based on avoiding obstacles.

11. A computer program product stored in a non-transitory computer readable medium, the computer program product including a computer-readable program, wherein the computer-readable program when executed on a computer causes the computer to:
    detect a user;
    estimate a first position and orientation of the user;
    determine a current position of a robot;
    generate an initial path from the current position of the robot to a goal position based on whether the robot affects the user while travelling on the initial path, wherein the robot affects the user if the user is disturbed by the robot;
    determine whether the user will traverse along a user path in response to the robot when the robot travels on the initial path;
    responsive to the user traversing in response to the robot, estimate a second position where the user will move when the robot is near the user; and
    generate a new path from the current position of the robot to the goal position.

12. The computer program product of claim 11, wherein the computer-readable program is further configured to:
  generate velocity constraints for the robot to follow the new path; and
  instruct the robot to move to the goal position based on the new path and the velocity constraints.

13. The computer program product of claim 11, wherein responsive to determining that the user will not traverse, instructing the robot to move based on the initial path.

14. The computer program product of claim 11, wherein generating the initial path further comprises:
  assigning a Gaussian cost to the user with a maximum range;
  receiving the goal position, an environment map, and the current position for the robot;
  generating a two-dimensional grid with the first position of the user, the current position of the robot, and the goal position;
  generating the initial path;
  determining whether the initial path will disturb the user; and
  responsive to the initial path failing to disturb the user, outputting the initial path.

15. The computer program product of claim 11, wherein generating the initial path further comprises:
  assigning a Gaussian cost to the user with a maximum range;
  receiving the goal position, an environment map, and the current position for the robot;
  generating a two-dimensional grid with the first position of the user, the current position of the robot, and the goal position;
  generating the initial path;
  determining whether the initial path will disturb the user;
  responsive to the initial path disturbing the user, revising the initial path to include a longer route that avoids disturbing the user; and
  outputting the initial path.

16. A system comprising:
  a processor; and
  a tangible, non-transitory memory storing instructions that, when executed, cause the system to:
    detect a user;
    estimate a first position and orientation of the user;
    determine a current position of a robot;
    generate an initial path from the current position of the robot to a goal position based on whether the robot affects the user while travelling on the initial path wherein the robot affects the user if the user is disturbed by the robot;
    determine whether the user will traverse along a user path in response to the robot when the robot travels on the initial path;
    responsive to the user traversing in response to the robot, estimate a second position where the user will move when the robot is near the user; and
    generate a new path from the current position of the robot to the goal position.

17. The system of claim 16, wherein the memory is further configured to:
  generate velocity constraints for the robot to follow the new path; and
  instruct the robot to move to the goal position based on the new path and the velocity constraints.

18. The system of claim 16, wherein responsive to determining that the user will not traverse, instructing the robot to move based on the initial path.

19. The system of claim 16, wherein generating the initial path further comprises:
  assigning a Gaussian cost to the user with a maximum range;
  receiving the goal position, an environment map, and the current position for the robot;
  generating a two-dimensional grid with the first position of the user, the current position of the robot, and the goal position;
  generating the initial path;
  determining whether the initial path will disturb the user; and
  responsive to the initial path failing to disturb the user, outputting the initial path.

20. The system of claim 16, wherein generating the initial path further comprises:
  assigning a Gaussian cost to the user with a maximum range;
  receiving the goal position, an environment map, and the current position for the robot;
  generating a two-dimensional grid with the first position of the user, the current position of the robot, and the goal position;
  generating the initial path;
  determining whether the initial path will disturb the user;
  responsive to the initial path disturbing the user, revising the initial path to include a longer route that avoids disturbing the user; and
  outputting the initial path.

* * * * *